US011635535B2

(12) United States Patent
Mino et al.

(10) Patent No.: US 11,635,535 B2
(45) Date of Patent: *Apr. 25, 2023

(54) SEISMIC SENSOR AND EARTHQUAKE DETERMINATION METHOD

(71) Applicant: Omron Corporation, Kyoto (JP)

(72) Inventors: Hiroyuki Mino, Osaka (JP); Naotsugu Ueda, Funabashi (JP); Masakazu Suzuki, Takatsuki (JP)

(73) Assignee: Omron Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,685

(22) Filed: Mar. 14, 2022

(65) Prior Publication Data
US 2022/0268956 A1     Aug. 25, 2022

Related U.S. Application Data

(63) Continuation of application No. 16/605,749, filed as application No. PCT/JP2018/009369 on Mar. 12, 2018, now Pat. No. 11,307,318.

(30) Foreign Application Priority Data

Jun. 30, 2017 (JP) .............................. JP2017-129940

(51) Int. Cl.
*G01V 1/00*     (2006.01)

(52) U.S. Cl.
CPC .................................. *G01V 1/008* (2013.01)

(58) Field of Classification Search
CPC .. G01V 1/008; G01V 2210/1232; G01V 1/18; G08B 21/10
See application file for complete search history.

(56) References Cited

U.S. PATENT DOCUMENTS

| | | | | |
|---|---|---|---|---|
| 5,484,968 A | * | 1/1996 | Nakamura | G01V 1/008 181/122 |
| 7,212,107 B2 | * | 5/2007 | Nakazawa | G01C 22/02 340/439 |

(Continued)

FOREIGN PATENT DOCUMENTS

| | | |
|---|---|---|
| CN | 105676269 A | 6/2016 |
| CN | 106297196 A | 1/2017 |

(Continued)

OTHER PUBLICATIONS

International Search Report issued in PCT/JP2018/009369 dated May 22, 2018 (2 pages).

(Continued)

*Primary Examiner* — Elias Desta
(74) *Attorney, Agent, or Firm* — Osha Bergman Watanabe & Burton LLP

(57) ABSTRACT

A seismic sensor includes a measurement unit configured to measure acceleration; an earthquake determination unit configured to determine whether or not an earthquake has occurred based on the acceleration measured in a predetermined determination period; an index calculator configured to calculate an index value indicating a scale of an earthquake in an earthquake processing period after the predetermined determination period, when the earthquake determination unit determines that an earthquake has occurred; a continuous earthquake determination unit configured to determine whether or not an earthquake has occurred, based on the acceleration measured in the earthquake processing period; and a shut-off determination unit configured to inhibit output of the shut-off signal regardless of the index value when the continuous earthquake determination unit determines that no earthquake has occurred.

12 Claims, 17 Drawing Sheets

(56) References Cited

U.S. PATENT DOCUMENTS

| | | | |
|---|---|---|---|
| 10,613,240 B2 | 4/2020 | Ueda et al. | |
| 11,307,318 B2 * | 4/2022 | Mino | ............... G01V 1/18 |
| 2017/0003406 A1 | 1/2017 | Ueda et al. | |
| 2018/0188396 A1 | 7/2018 | Sakuma et al. | |

FOREIGN PATENT DOCUMENTS

| | | |
|---|---|---|
| JP | S58-88686 A | 5/1983 |
| JP | 200343154 A | 2/2003 |
| JP | 2003164056 A | 6/2003 |
| JP | 2006105759 A | 4/2006 |
| JP | 2007-33428 A | 2/2007 |
| JP | 5375435 B2 | 12/2013 |
| JP | 5405813 B2 | 2/2014 |
| JP | 2015148539 A | 8/2015 |
| JP | 2017-015604 A | 1/2017 |

OTHER PUBLICATIONS

Written Opinion of the International Searching Authority issued in PCT/JP2018/009369 dated May 22, 2018 (6 pages).
Yayong Wang,"A Real-time Seismic Signal Detection Method based on Energy Spectrum" China Earthquake, vol. 2, No. 1 dated Dec. 31, 1986 (10 pages).
Office Action issued in Chinese Application No. 201880024339.1; dated Oct. 26, 2020 (13 pages).
Extended European Search Report issued in Application No. 18823360. 5, dated Mar. 4, 2021 (10 pages).

* cited by examiner

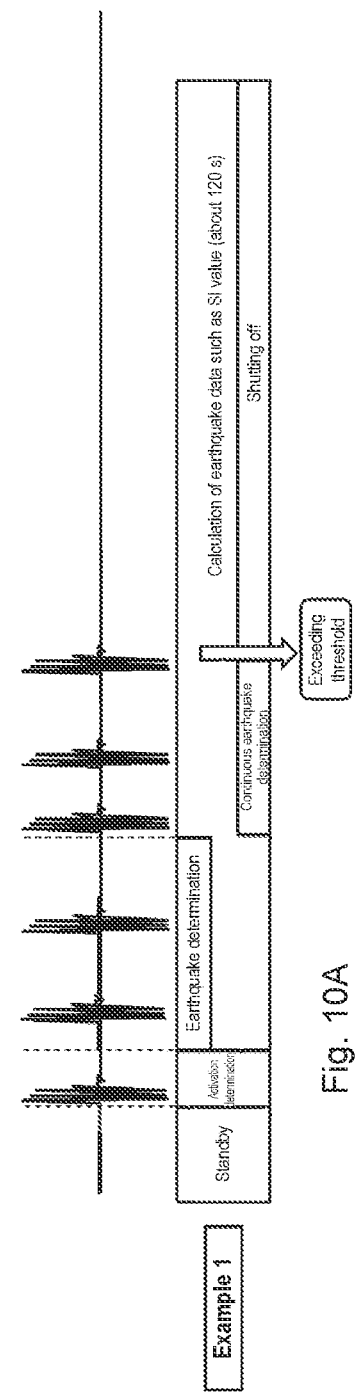
Fig. 10A
Fig. 10B

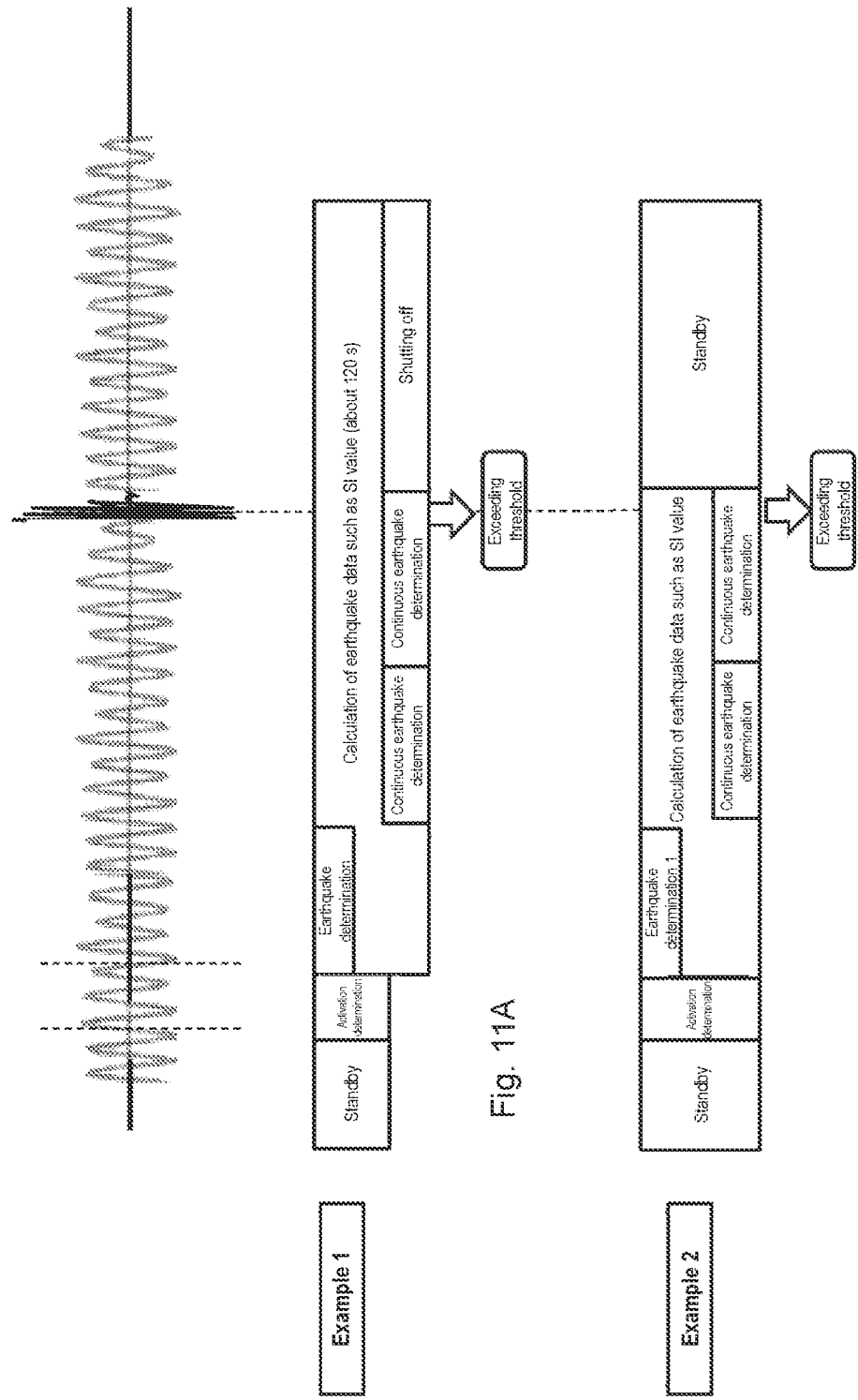

Fig. 12

| | One time determination period | Repeatedly executed determination period |
|---|---|---|
| With condition of 700 gal or more | Process returns to standby state when, in first determination period, there is maximum acceleration value of 700 gal or more and then acceleration value (including offset correction) of ±50 gal or less occurs continuously for 10 times.<br>This is prioritized over condition of less than 100 gal in earthquake determination. | Daily life vibration state is determined when, in first determination period, there is maximum acceleration of 700 gal or more, MAX - MIN is determined to be less than 100 gal, and acceleration value (including offset correction) of ±50 gal or less occurs continuously for 10 times. Earthquake determination is repeated in case of daily life vibration state. SI value is reset once in case of daily life vibration state. |
| Without condition of 700 gal or more | Process returns to standby state when, in first determination period, MAX - MIN is determined to be less than 100 gal, or acceleration value of ±50 gal or less occurs continuously for 10 times.<br>However, offset value is not updated in case of MAX - MIN less than ±100 gal and ±50 gal or less continuous for 10 times. | Daily life vibration state is determined when, in first determination period, MAX - MIN is determined to be less than 100 gal, and acceleration value (including offset correction) of ±50 gal or less occurs continuously for 10 times. Earthquake determination is repeated in case of daily life vibration state. SI value is reset once in case of daily life vibration state. |

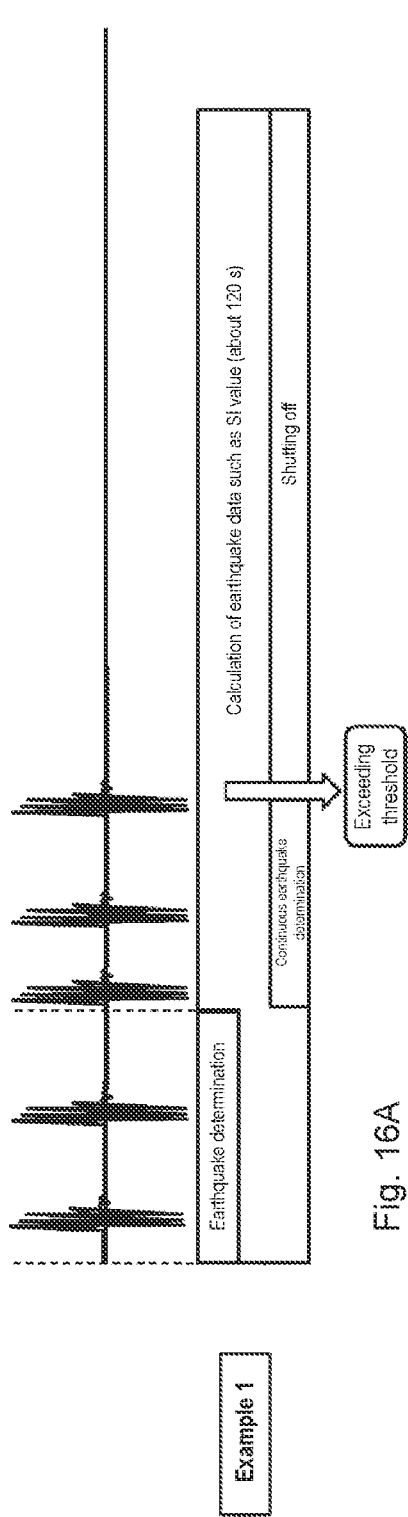

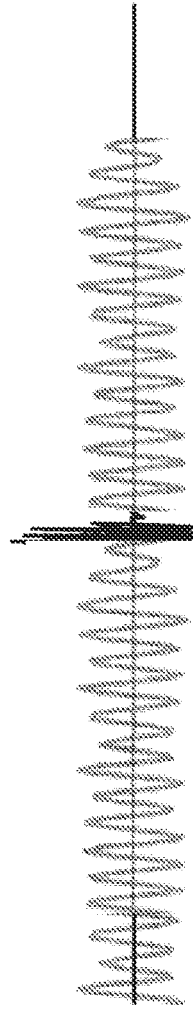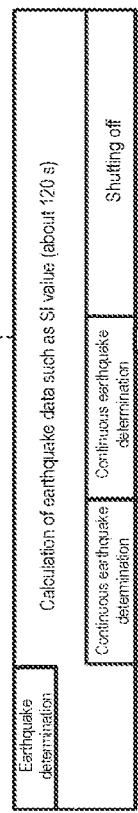
Fig. 17A
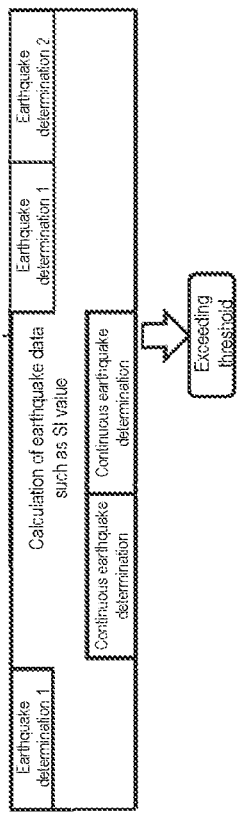
Fig. 17B

SEISMIC SENSOR AND EARTHQUAKE DETERMINATION METHOD

CROSS-REFERENCE TO RELATED APPLICATIONS

The present application claims priority from U.S. patent Ser. No. 16/605,749, which is a National Stage Entry of International Patent No. PCT/JP2018/009369 filed Mar. 12, 2018, which claims priority from Japanese Patent Application No. 2017-129940 filed Jun. 30, 2017. The content of both applications are incorporated herein in their entirety.

TECHNICAL FIELD

The present invention relates to a seismic sensor and an earthquake determination method.

BACKGROUND ART

In a case of a device that is provided in a meter box or the like and is driven by a battery, for example, such as a seismic sensor used to shut off gas and electricity when an earthquake occurs, it is particularly desirable to reduce standby power. However, while a seismic sensor using a microcontroller can obtain an index value for evaluating a scale of an earthquake through arithmetic processing, power consumption tends to increase as compared with a mechanical seismic sensor that is energized in response to vibration, which has been conventionally used. In addition, depending on an environment in which the device is installed, noise due to human-based vibration is also measured, and a degree of measured noise varies. Moreover, if such noise is repeatedly detected erroneously as an earthquake, the power consumption of the seismic sensor increases.

In this regard, there is proposed a technique for improving the accuracy of determination by performing earthquake determination after shifting from a power saving mode to a measurement mode, and filtering measured acceleration in the seismic sensor that returns to the power saving mode, to remove a noise component when it is determined as not an earthquake (for example, Patent Document 1).

Processing by the seismic sensor described above is to perform processing such as: shifting from a power saving mode to the measurement mode to perform earthquake determination when acceleration of a predetermined level or higher is detected; calculating an evaluation index indicating a scale of the earthquake when it is determined that an earthquake has occurred, while returning to the power saving mode when it is determined as not an earthquake; and notifying an external device or a related device when a scale of the earthquake is a certain level or higher.

PRIOR ART DOCUMENT

Patent Document

Patent Document 1: Japanese Unexamined Patent Publication No. 2017-15604

SUMMARY OF THE INVENTION

Problems to be Solved by the Invention

Conventionally, the determination as to whether vibration measured by the seismic sensor is an earthquake or noise has been made based on vibration immediately after the seismic sensor shifts from a power saving mode to a measurement mode. However, as described above, a pulse impact caused by daily life vibration due to human-based vibration or the like may have been erroneously determined as an earthquake. Further, even in a case where there is such erroneous determination, if an evaluation index value indicating a scale of the earthquake is a certain value or more, there has been a case where a shut-off signal for shutting off energy supply such as gas or electricity is erroneously output to an external device or a related device on the assumption that a scale of the earthquake a certain level or higher.

The present invention has been made in view of the above problem, and an object thereof is to provide a technique that can suppress erroneous determination of noise as an earthquake in a seismic sensor and erroneous output of a shut-off signal.

Means for Solving the Problem

A seismic sensor according to the present invention includes: a measurement unit configured to measure acceleration;

an earthquake determination unit configured to determine whether or not an earthquake has occurred based on the acceleration measured in a determination period that is predetermined; and an index calculator configured to calculate an index value indicating a scale of an earthquake in an earthquake processing period after the determination period, when the earthquake determination unit determines that an earthquake has occurred.

In the seismic sensor, in the earthquake processing period, when an index value calculated by the index calculator is equal to or larger than a predetermined threshold, a shut-off signal for shutting off an operation is output to an external device or a related device provided together.

The seismic sensor further includes:

a continuous earthquake determination unit configured to determine whether or not an earthquake has occurred, based on the acceleration measured in the earthquake processing period; and a shut-off determination unit configured to inhibit output of the shut-off signal regardless of the index value, when the continuous earthquake determination unit determines that no earthquake has occurred.

Here, in a conventional seismic sensor, when an earthquake determination unit determines that an earthquake has occurred, an index calculator calculates an index value indicating a scale of the earthquake, in an earthquake processing period after a determination period. Then, when the calculated index value is equal to or larger than a predetermined threshold, for example, a shut-off signal is output toward an external device or a related device connected with the seismic sensor, and the external device or the related device shuts off electricity or gas based on this signal. Whereas, in the present invention, the continuous earthquake determination unit temporarily determines that an earthquake has occurred in the determination period for the earthquake determination, and continues determination as to whether or not an earthquake has occurred even after shifting to the earthquake processing period. Then, when the continuous earthquake determination unit determines that an earthquake has not occurred in the earthquake processing period, the shut-off determination unit inhibits output of the shut-off signal regardless of the index value.

Consequently, when noise other than an earthquake is erroneously determined as an earthquake in the determination period and shift is made to the earthquake processing period, the determination as to whether or not an earthquake has occurred continues in parallel with the calculation of the index value by the index calculator. Then, when it is determined that no earthquake has occurred in the earthquake processing period, the shut-off signal is not output regardless of the index value. As a result, it is possible to prevent output of a shut-off signal to the external device or the related device when the seismic sensor erroneously determines noise due to other cause as an earthquake, and it is possible to more reliably prevent shutting off of an operation of the related device. Note that the present invention may be applied to a seismic sensor that shifts from a power saving mode to a measurement mode with higher power consumption than that of the power saving mode when acceleration measured by the measurement unit exceeds a predetermined threshold, in which the predetermined determination period is a period after shifting to the measurement mode.

Further, in the present invention, a determination criterion in the earthquake determination unit and the continuous earthquake determination unit may be:

a. an acceleration value;

b. a maximum value, a minimum value, a difference between a maximum value and a minimum value, an average value, a sum of an average value and a variance value, a variance value, an integrated value, a change rate, spectral intensity, and integral value, of an acceleration value;

c. a response speed value or a speed value calculated from acceleration;

d. a maximum value, a minimum value, a difference between a maximum value and a minimum value, an average value, a sum of an average value and a variance value, a variance value, an integrated value, a change rate, spectral intensity, and integral value, of a response speed value or a speed value;

e. a displacement value calculated from an acceleration value;

f. a maximum value, a minimum value, a difference between a maximum value and a minimum value, an average value, a sum of an average value and a variance value, a variance value, an integrated value, a change rate, spectral intensity, and integral value, of a displacement value;

g. an SI (spectrum intensity) value calculated from acceleration;

h. a maximum value, a minimum value, a difference between a maximum value and a minimum value, an average value, a sum of an average value and a variance value, a variance value, an integrated value, a change rate, spectral intensity, and integral value, of an SI (spectrum intensity) value;

i. a peak frequency;

j. a magnitude relationship in comparing values of a to i described above in a predetermined section with a predetermined threshold;

k. a number of consecutive times when values of a to i described above exceed a threshold, or a number of times when a condition is satisfied in a specified number of times; and l. any combination of a to k above. Note that the predetermined section may be the entire section of the earthquake determination and the impact determination, or may be a smaller unit. Further, the predetermined section may be a constant value or a variation value. For example, as an example of the variation value, a difference between acceleration values may be constantly calculated, and the predetermined section may be between a point where + changes to − and a point where + changes to − next. Further, in addition to comparison of a threshold, the determination may be made based on a number of consecutive times when a threshold is exceeded, or a number of times when a condition is satisfied in a specified number of times. Alternatively, the determination may be made from comparison of frequency characteristics by spectral frequency resolution such as FFT.

Further, in the present invention, the determination criterion in the continuous earthquake determination unit may be the same determination criterion as the determination criterion in the earthquake determination unit. This enables same earthquake determination to be continued in the earthquake processing period. Further, the determination criterion in the continuous earthquake determination unit may be different determination criterion from the determination criterion in the earthquake determination unit. This enables determination with higher flexibility and higher accuracy with the combination of the earthquake determination unit and the continuous earthquake determination unit, such as, for example, determining that an earthquake has occurred even in a case of an impact caused by daily life vibration in the earthquake determination unit just in case, while determining that the impact caused by daily life vibration is noise and not an occurrence of an earthquake in the continuous earthquake determination unit.

Further, in the present invention, when the continuous earthquake determination unit determines that no earthquake has occurred, the shut-off determination unit outputs a shut-off signal in such a way that a higher-level system can recognize as the shut-off signal due to a factor other than an earthquake. Here, as a method for the higher-level system to recognize as a shut-off signal due to a factor other than an earthquake, for example, the shut-off output itself may be output in a pattern different from that of the shut-off output due to an earthquake, or discrimination as to whether being caused by an earthquake or not may be made possible by reading internal information of the seismic sensor. The expression of being not an earthquake may be embodied as an impact or noise. This enables the continuous earthquake determination unit to determine processing on the external device or related device side that has received the shut-off signal, independently of the processing of the seismic sensor, for example, when an impact based on a predetermined daily life vibration is detected. As a result, it is possible to construct processing contents with a higher flexibility as a whole system.

Further, the present invention may be an earthquake determination method including: an earthquake determination step of determining whether or not an earthquake has occurred based on the acceleration measured in a determination period that is predetermined; and an index calculation step of calculating an index value indicating a scale of an earthquake in an earthquake processing period after the determination period, when it is determined that an earthquake has occurred in the earthquake determination step.

In the earthquake determination method, when an index value calculated in the earthquake processing period is equal to or larger than a predetermined threshold, a shut-off signal for shutting off an operation of a related device is output.

The earthquake determination method further includes: a continuous earthquake determination step of determining whether or not an earthquake has occurred, based on the acceleration measured in the earthquake processing period; and a shut-off determination step of inhibiting output of the shut-off signal regardless of the index value when it is determined that no earthquake has occurred in the continuous earthquake determination step. In this case, the present invention may be applied to an earthquake determination method in which a power saving mode is shifted to a measurement mode with higher power consumption than that of the power saving mode when measured acceleration exceeds a predetermined threshold, and the predetermined determination period is a period after shifting to the measurement mode.

Further, the present invention may the earthquake determination method described above in which a determination criterion in the earthquake determination step and the continuous earthquake determination step is:

a. an acceleration value;

b. a maximum value, a minimum value, a difference between a maximum value and a minimum value, an average value, a sum of an average value and a variance value, a variance value, an integrated value, a change rate, spectral intensity, and integral value, of an acceleration value;

c. a response speed value or a speed value calculated from acceleration;

d. a maximum value, a minimum value, a difference between a maximum value and a minimum value, an average value, a sum of an average value and a variance value, a variance value, an integrated value, a change rate, spectral intensity, and integral value, of a response speed value or a speed value;

e. a displacement value calculated from an acceleration value;

f. a maximum value, a minimum value, a difference between a maximum value and a minimum value, an average value, a sum of an average value and a variance value, a variance value, an integrated value, a change rate, spectral intensity, and integral value, of a displacement value;

g. an SI (spectrum intensity) value calculated from acceleration;

h. a maximum value, a minimum value, a difference between a maximum value and a minimum value, an average value, a sum of an average value and a variance value, a variance value, an integrated value, a change rate, spectral intensity, and integral value, of an SI (spectrum intensity) value;

i. a peak frequency;

j. a magnitude relationship in comparing values of a to i described above in a predetermined section with a predetermined threshold;

k. a number of consecutive times when values of a to i described above exceed a threshold, or a number of times when a condition is satisfied in a specified number of times; and l. any combination of a to k above. Here, the predetermined section may be the entire section of the earthquake determination and the impact determination, or may be a smaller unit. Further, the predetermined section may be a constant value or a variation value. For example, as an example of the variation value, a difference between acceleration values may be constantly calculated, and the predetermined section may be between a point where + changes to − and a point where + changes to − next. Further, in addition to comparison of a threshold, the determination may be made based on a number of consecutive times when a threshold is exceeded, or a number of times when a condition is satisfied in a specified number of times. Alternatively, the determination may be made from comparison of frequency characteristics by spectral frequency resolution such as FFT.

Further, the present invention may be the earthquake determination method described above in which the determination criterion in the continuous earthquake determination step is the same as the determination criterion in the earthquake determination step.

Further, the present invention may be the earthquake determination method described above in which, when it is determined that no earthquake has occurred in the continuous earthquake determination step, a shut-off signal is output in such a way that a higher-level system can recognize as the shut-off signal due to a factor other than an earthquake, in the shut-off determination step. Here, as a method for the higher-level system to recognize as a shut-off signal due to a factor other than an earthquake, for example, the shut-off output itself may be output in a pattern different from that of the shut-off output due to an earthquake, or discrimination as to whether being caused by an earthquake or not may be made possible by reading internal information of the seismic sensor. The expression of being not an earthquake may be embodied as an impact or noise.

It should be noted that the contents described in MEANS FOR SOLVING THE PROBLEM can be combined as much as possible without departing from the problems and technical ideas of the present invention.

Effect of the Invention

According to the above invention, it is possible to more reliably suppress erroneous determination of noise as an earthquake in the seismic sensor and erroneous output of a shut-off signal.

BRIEF DESCRIPTION OF THE DRAWINGS

FIGS. 10A and 10B are views showing an operation of the seismic sensor when the earthquake determination processing according to Example 1 is executed, and when the earthquake determination processing according to Example 2 is executed, in a case where acceleration due to a pulse impact is detected.

FIGS. 11A and 11B are views showing an operation of the seismic sensor when continuous earthquake determination processing according to Example 1 is executed, and when the continuous earthquake determination processing according to Example 2 is executed, in a case where acceleration due to a pulse impact is detected in earthquake processing.

FIG. 12 is a view showing variations of earthquake determination conditions in the earthquake determination processing.

FIGS. 16A and 16B are views showing an operation of the seismic sensor in the earthquake determination processing when acceleration due to a pulse impact is detected in a case where the power saving mode is not set.

FIGS. 17A and 17B are views showing an operation of the seismic sensor when acceleration due to a pulse impact is detected in the continuous earthquake determination processing in a case where the power saving mode is not set.

MODE FOR CARRYING OUT THE INVENTION

Example 1

Hereinafter, a seismic sensor according to Example 1 of the present invention will be described with reference to the drawings. However, the example described below shows an example of a seismic sensor, and the seismic sensor according to the present invention is not limited to the following configuration.

[Device Configuration]

Figure 1:
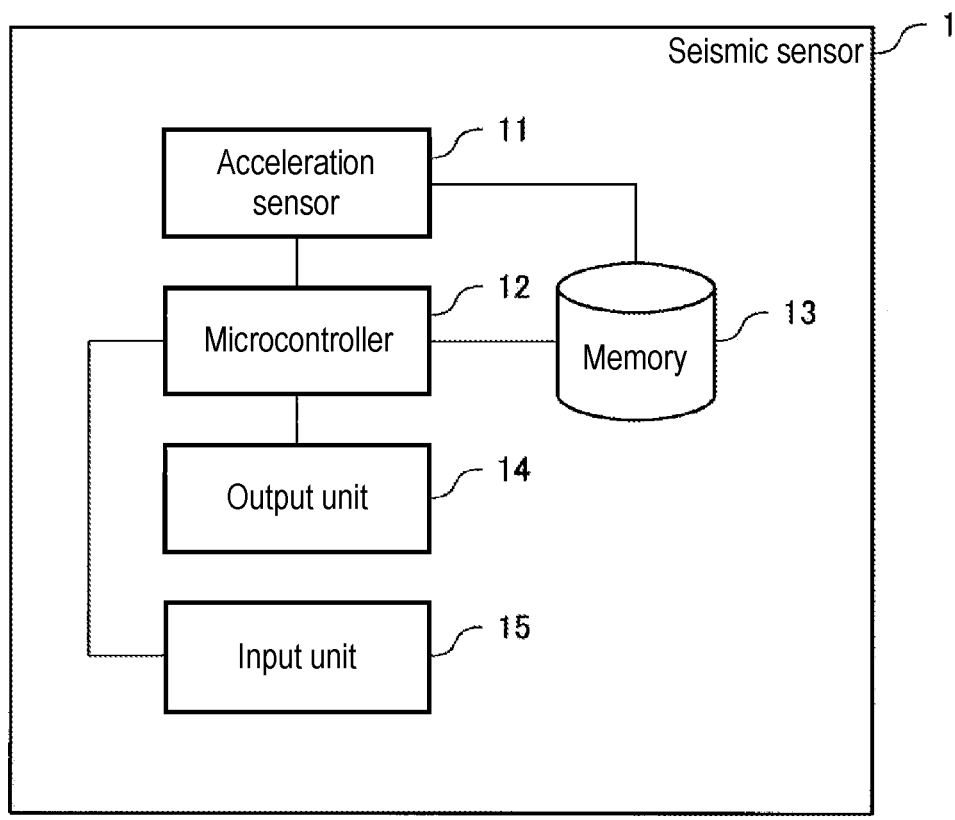
FIG. 1 is a device configuration diagram showing an example of a seismic sensor.

FIG. 1 is a device configuration diagram showing an example of a seismic sensor according to the example. A seismic sensor 1 includes an acceleration sensor 11, a microcontroller 12, a memory 13, an output unit 14, and an input unit 15. The acceleration sensor 11 is, for example, an acceleration sensor using a piezoelectric element or an acceleration sensor that detects electrostatic capacity between electrodes. Note that acceleration measured (also referred to as "sampled") by the acceleration sensor 11 is output to the microcontroller 12. The microcontroller 12 is a general-purpose integrated circuit, for example. The microcontroller 12 acquires the acceleration measured by the acceleration sensor 11 at a predetermined cycle, and detects an occurrence of an earthquake and calculates an index value indicating a scale of the earthquake based on the acceleration.

Further, the microcontroller 12 operates in different forms, such as an active mode or a sleep mode, depending on the situation. The sleep mode is an operation mode that reduces power consumption as compared with the active mode, by the microcontroller 12 operating with limited functions, such as stopping execution of instructions while receiving interruptions, or stopping clock supply. In the active mode, the microcontroller 12 performs determination processing as to whether detected vibration is an earthquake or noise, and calculates an index value indicating a scale of the earthquake.

The memory 13 is a temporary memory such as a random access memory (RAM) or a non-volatile memory such as an erasable programmable read only memory (EPROM), and holds, for example, measured acceleration, a threshold used for earthquake determination, and the like. Note that the memory 13 may be a memory built in the acceleration sensor 11 or the microcontroller 12. Further, the output unit 14 is an output terminal included in the microcontroller 12, for example. For example, when it is determined that an earthquake has occurred, the microcontroller 12 outputs information indicating the occurrence of the earthquake and a scale thereof to another device via the output unit 14. Further, the input unit 15 is an input terminal included in the microcontroller 12. The microcontroller 12 may receive, for example, an operation of a switch (not shown) or a command input from another device via the input unit 15. Note that a high-pass filter (not shown) may be provided between the acceleration sensor 11 and the microcontroller 12 to remove a gravity component. Further, the microcontroller 12 may handle the acceleration measured by the acceleration sensor 11 by converting into an absolute value of the acceleration with a predetermined offset as a reference.

[Function Configuration]

Figure 2:
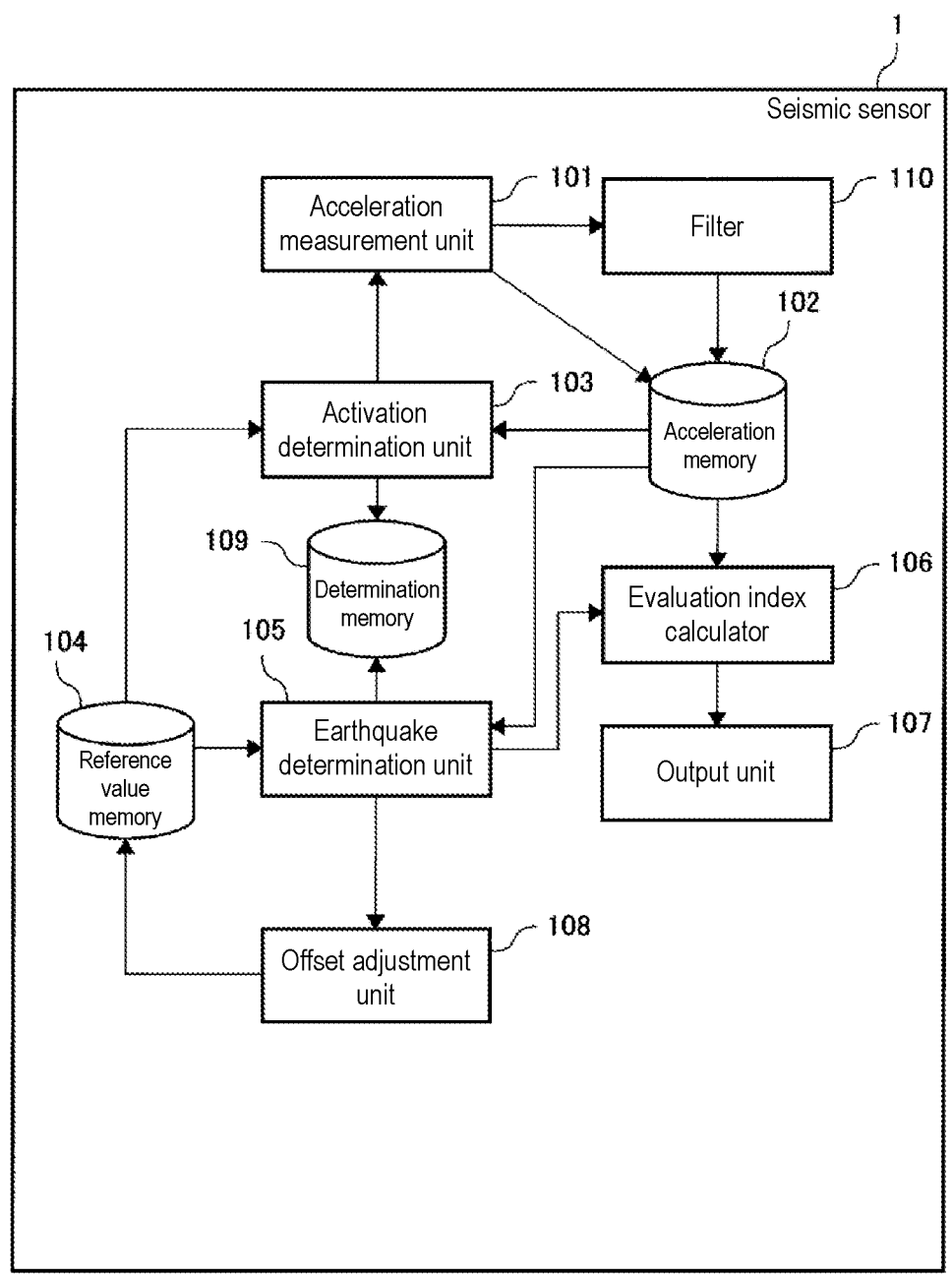
FIG. 2 is a functional block diagram showing an example of the seismic sensor.

Next, FIG. 2 is a functional block diagram showing an example of a conventional seismic sensor 1. The seismic sensor 1 includes an acceleration measurement unit 101, an acceleration memory 102, an activation determination unit 103, a reference value memory 104, an earthquake determination unit 105, an evaluation index calculator 106, an output unit 107, an offset adjustment unit 108, a determination memory 109, and a filter 110. Note that the acceleration measurement unit 101, the activation determination unit 103, the earthquake determination unit 105, the evaluation index calculator 106, the offset adjustment unit 108, and the filter 110 are realized by the acceleration sensor 11 or the microcontroller 12 shown in FIG. 1 operating based on a predetermined program. Further, the acceleration memory 102, the reference value memory 104, and the determination memory 109 are realized by the memory 13 in FIG. 1. Note that at least the earthquake determination unit 105 and the evaluation index calculator 106 are realized by the microcontroller 12 operating in the active mode. Further, the output unit 107 is realized by the microcontroller 12 and the output unit 14 of FIG. 1 operating based on a predetermined program.

The acceleration measurement unit 101 measures acceleration at a predetermined cycle. Note that the acceleration measurement unit 101 normally repeats the measurement of acceleration at a relatively low speed (that is, a relatively large measurement cycle). Moreover, when performing such low-speed sampling, the microcontroller 12 basically operates in the sleep mode. Such an operation state with low power consumption is also referred to as "standby state" or "power saving mode". In other words, the "standby state" is an operation state for performing low-speed sampling. At this time, since the microcontroller 12 operates in the sleep mode with limited functions, power consumption is suppressed.

Further, when the acceleration measurement unit 101 detects vibration larger than a threshold preset in the reference value memory 104, the acceleration measurement unit 101 repeats the acceleration measurement at a higher speed (that is, a relatively small cycle) than that in low-speed sampling. When performing such high-speed sampling, the microcontroller 12 operates in the sleep mode or the active mode. Note that, when the earthquake determination unit 105 or the evaluation index calculator 106 performs processing, the microcontroller 12 operates in the active mode. An operation state during such high-speed sampling is also referred to as "measurement mode", and shift of the operation state from the power saving mode to the measurement mode is also referred to as "activation". In other words, the "measurement mode" is an operation state for performing high-speed sampling. At this time, the microcontroller 12 may operate in the sleep mode with limited functions, and may also operate in the active mode enabling the operation with the maximum calculation capacity. In the measurement mode, the sampling cycle is shortened, and the microcontroller 12 switches from the sleep mode to the active mode, which increases power consumption than that in the power saving mode.

The filter 110 performs filtering processing on an acceleration value measured by the acceleration measurement unit 101, and causes the acceleration memory 102 to store the filtered acceleration. In the embodiment, the filter 110 functions as a so-called digital filter. An existing technique can be adopted as a specific method of the filtering. The filter 110 functions as a low-pass filter, for example, by calculating a moving average of absolute values of acceleration.

Further, the acceleration memory 102 holds the acceleration value measured by the acceleration measurement unit 101 or the acceleration value filtered by the filter 110. The activation determination unit 103 compares the acceleration value measured by the acceleration measurement unit 101 with an activation threshold stored in the reference value memory 104, and activates the power saving mode to the measurement mode when the acceleration value exceeds the activation threshold. Further, the earthquake determination unit 105 uses the acceleration measured by the acceleration measurement unit 101 in the measurement mode and a threshold preset in the reference value memory 104, to determine whether the measured acceleration indicates an earthquake or is noise. In the example, the earthquake determination unit 105 defines one or a plurality of determination periods after the activation determination unit 103 detects acceleration exceeding the activation threshold, and performs processing for each determination period.

When the earthquake determination unit 105 determines to be an earthquake, the evaluation index calculator 106 calculates an evaluation index indicating a scale of the earthquake. For example, an SI (spectrum intensity) value is calculated as an earthquake evaluation index. Then, the output unit 107 outputs the calculated SI value to an external device. In addition, in the external device, when it is determined that the earthquake is of a predetermined scale or more based on the SI value, for example, processing of shutting off energy supply such as gas or electricity may be performed.

Whereas, when the earthquake determination unit 105 determines that the vibration is noise, the offset adjustment unit 108 performs so-called offset adjustment. In the example, a noise component included in a measured acceleration, such as: a change amount in the measured value caused with a change of the sensor over time; a change amount in the measured value caused with a temperature change; or a change amount in the measured value caused with a direction change of gravitational acceleration with respect to the sensor when a position of the installed sensor tilts for some reason, is called an offset component. The offset adjustment unit 108 calculates, for example, a median value of maximum and minimum acceleration values determined as noise or an average value of the acceleration, as the offset component.

Figure 3:
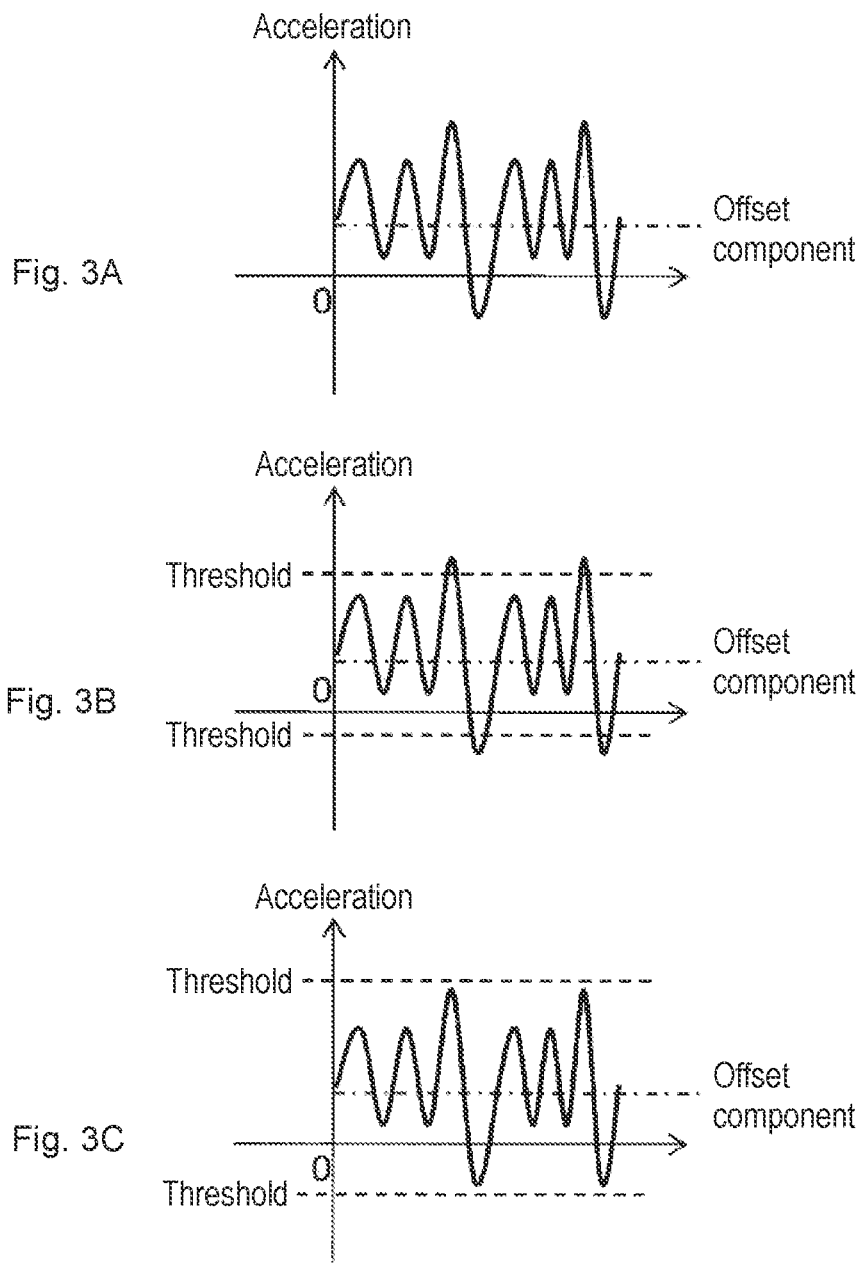
FIGS. 3A to 3C are views for explaining acceleration measured in the embodiment and thresholds.

FIGS. 3A to 3C are views for explaining acceleration measured in the embodiment, an offset component, and a threshold. In the graphs of FIGS. 3A to 3C, a vertical axis indicates magnitude of acceleration, and a horizontal axis indicates a lapse of time. When vibration indicated by a thick solid line is measured as shown in FIG. 3A, the offset component can be obtained as an average value of acceleration as indicated by a one dotted chain line, for example. The calculated offset component is stored in the reference value memory 104, and used for activation determination executed by the activation determination unit 103, and earthquake determination executed by the earthquake determination unit 105. Further, as shown in FIGS. 3B and 3C, when vibration indicated by a thick solid line is measured, the threshold is defined as a value relative to the offset component as indicated by a broken line.

[Seismic Processing]

Figure 4:
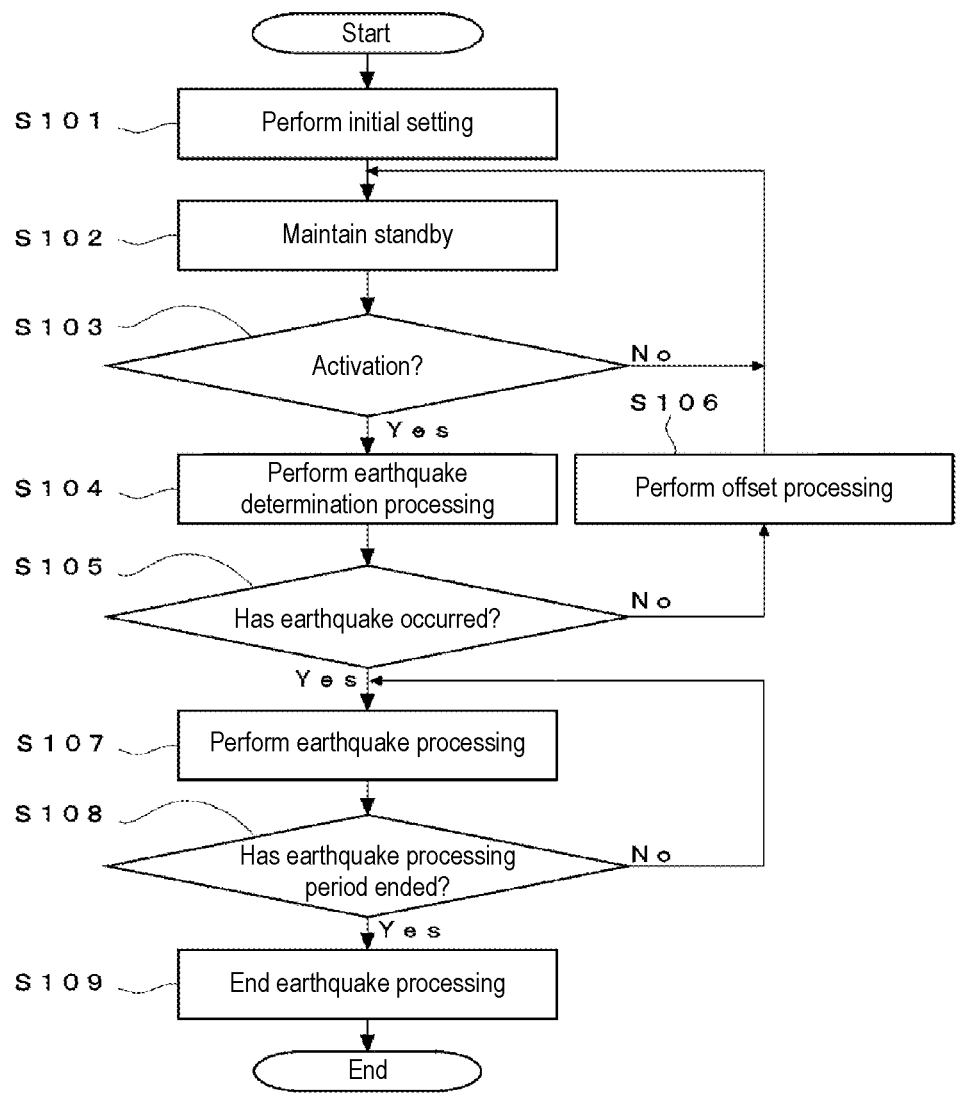
FIG. 4 is a processing flowchart showing an example of conventional seismic processing in the seismic sensor.

FIG. 4 is a processing flowchart showing an example of conventional seismic processing by the conventional seismic sensor 1 described above. The seismic processing by the seismic sensor 1 is processing of shifting from the standby state (power saving mode) to the measurement mode to perform earthquake determination processing when acceleration of a predetermined level or higher is detected, further shifting to earthquake processing when it is determined that an earthquake has occurred, and causing output of a shut-off signal to a related device when a scale of the earthquake is a certain level or higher. This routine is repeatedly and continuously executed by the seismic sensor 1. When this routine is executed, first, in S101, a threshold (reference value) value and the like stored in the reference value memory 104 and used for the seismic processing is initially set. When the processing of S101 ends, the process proceeds to S102. In S102, the standby state is maintained. More specifically, the acceleration measurement unit 101 of the seismic sensor 1 measures acceleration in the power saving mode. In the standby state, the acceleration measurement unit 101 performs low-speed sampling. When the processing of S102 ends, the process proceeds to S103. In S103, the activation determination unit 103 of the seismic sensor 1 determines whether or not to activate (that is, shift to the measurement mode).

In this step, when the acceleration measured in S102 is equal to or less than the threshold (also referred to as "activation threshold") shown in FIGS. 3A to 3C (S103: NO), the process returns to S102, to continue the standby state (power saving mode). Here, the activation threshold is a value representing acceleration such as 50 gal, for example, and is initially set in S101 and held in the reference value memory 104. Whereas, when the acceleration measured in the standby state of S102 is larger than the threshold shown in FIGS. 3A to 3C (S103: YES), the acceleration measurement unit 101 shifts to the earthquake determination processing (measurement mode) in S104. Note that, as shown in FIGS. 3B and 3C, the activation threshold is a relative value with the offset as a reference. Further, in the earthquake determination processing (measurement mode), the acceleration measurement unit 101 performs high-speed sampling.

Further, in the earthquake determination processing of S104, the acceleration measurement unit 101 measures acceleration by high-speed sampling in the earthquake determination processing (measurement mode), the filter 110 performs the above-described filtering processing on the measured acceleration, the acceleration memory 102 stores a value of the result, and the evaluation index calculator 106 starts calculation of a predetermined evaluation index. Note that the filtering may be executed by the microcontroller 12 after shifting to the active mode, or may be executed by the acceleration sensor 11 while the microcontroller 12 remains in the sleep mode. Note that the filtering is not essential in the earthquake determination processing. Moreover, the processing of S104 corresponds to a conventional earthquake determination step.

Further, at this time, as the evaluation index, for example, calculation of an SI value is started. The SI value is an example of the earthquake evaluation index, and is a value that is recognized to be correlated with a degree of damage to a building. Note that the output unit 107 of the seismic sensor 1 outputs the calculated evaluation index to another device in a later step. Specifically, the SI value can be obtained by the following Equation (1).

[Formula 1]

$$SI = \frac{1}{2.4} \int_{0.1}^{2.5} Sv(T, h)dT \qquad (1)$$

The SI value described above is an index representing destructive power of earthquake motion with an average of integral values of a speed response spectrum between 0.1 seconds and 2.5 seconds, which is a natural period of a highly rigid structure. Note that Sv is a speed response spectrum, T is a cycle, and h is an attenuation constant.

When a predetermined determination period has elapsed in the earthquake determination processing of S104, the process proceeds to S105. In S105, it is determined whether or not an earthquake has occurred. More specifically, the earthquake determination unit 105 determines whether the acceleration value measured in the earthquake determination processing in S104 satisfies a predetermined condition. For example, the earthquake determination unit 105 determines that an earthquake has occurred, when a difference between a maximum value and a minimum value of acceleration measured in the determination period is 100 gal or more.

When it is determined in S105 that an earthquake has occurred (S105: YES), the process proceeds to the earthquake processing in S107. Whereas, when it is determined in S105 that no earthquake has occurred (S105: NO), the process proceeds to offset processing in S106. In this offset processing, the offset adjustment unit 108 of the seismic sensor 1 adjusts the above-described offset. In this step, as an offset, for example, there is obtained an average value of the acceleration indicated by a one dotted chain line in FIG. 3A. In this way, a threshold reference is adjusted. When the processing of S106 ends, the process returns to the standby state of S102.

In S107, the evaluation index calculator 106 of the seismic sensor 1 calculates an evaluation index indicating a scale of the earthquake. Note that, in calculating the evaluation index, the microcontroller 12 operates in the active mode. The evaluation index can be calculated as the SI value of the above-described Equation (1). Then, when the evaluation index calculated here is larger than a threshold, it is determined that an earthquake of an estimated strength or more has occurred, and the shut-off output is output to an external device (not shown) provided with the seismic sensor 1. When the processing of S107 ends, the process proceeds to S108. Note that the step of calculating the SI value in the processing of S107 corresponds to an index calculation step. (This index calculation step may include a SI value calculation step in the earthquake determination processing.)

In S108, it is determined whether or not an earthquake processing period has ended. This earthquake processing period is a period that is initially set in S101 in advance, and may be a period such as 120 seconds, for example. When it is determined in S108 that the earthquake processing period has not yet ended, the process returns to the processing before S107 to continue the earthquake processing. Whereas, when it is determined in S108 that the earthquake processing period has ended, the process proceeds to S109. In S109, the earthquake processing ends, the SI value calculation also stops, and the SI value is reset. When the processing of S109 ends, the processing of this routine temporarily ends.

However, in the conventional seismic processing as described above, since the earthquake determination is not performed in the earthquake processing, there has been a case where a shut-off signal is output when the SI value increases due to noise, for example, even in a case where the determination of the earthquake determination processing has been a mistake, or a case where the earthquake has been settled during the earthquake processing.

Figure 5:
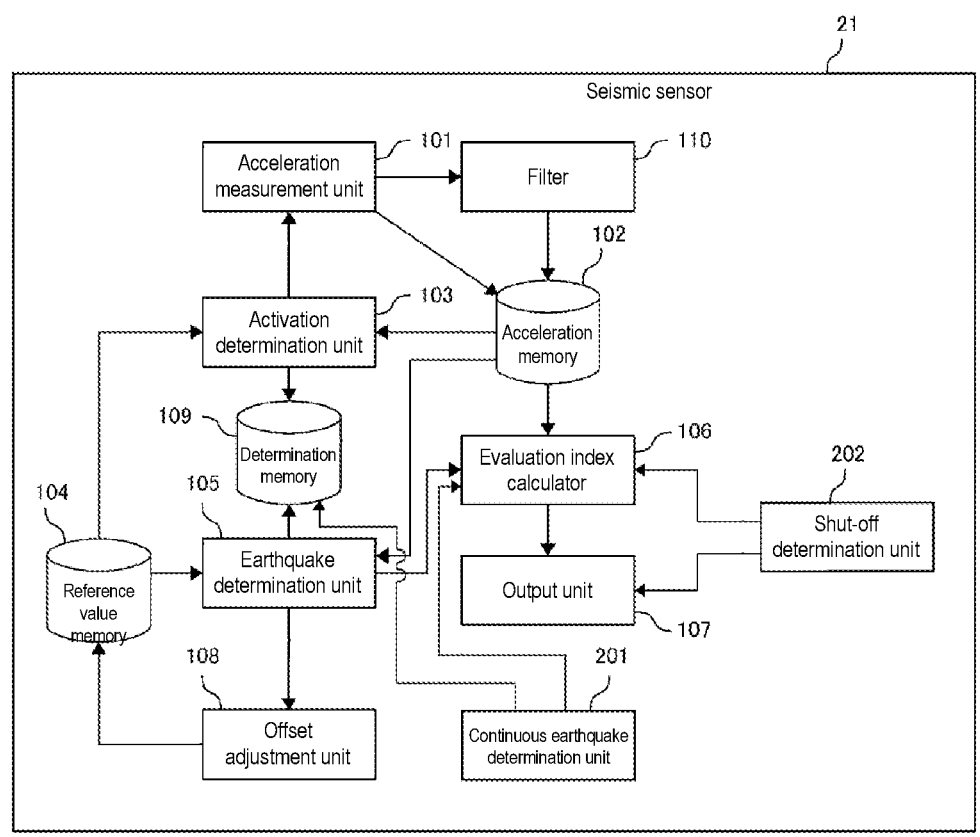
FIG. 5 is a functional block diagram of the seismic sensor according to Example 1 of the present invention.

Whereas, FIG. 5 shows a functional block diagram of a seismic sensor 21 in the example. The seismic sensor 21 in the example is different from the seismic sensor 1 shown in FIG. 2 in that the seismic sensor 21 includes: a continuous earthquake determination unit 201 configured to continue determination as to whether acceleration is caused by an earthquake or other noise even after shifting to the earthquake processing; and the shut-off determination unit 202 configured not to output an SI value to an external device (not shown) and to inhibit output of a shut-off signal to the external device when it is determined by the continuous earthquake determination unit 201 that the vibration is not caused by an earthquake but caused by noise, even in a case where shift is made to seismic processing and an SI value exceeds a threshold.

Figure 6:
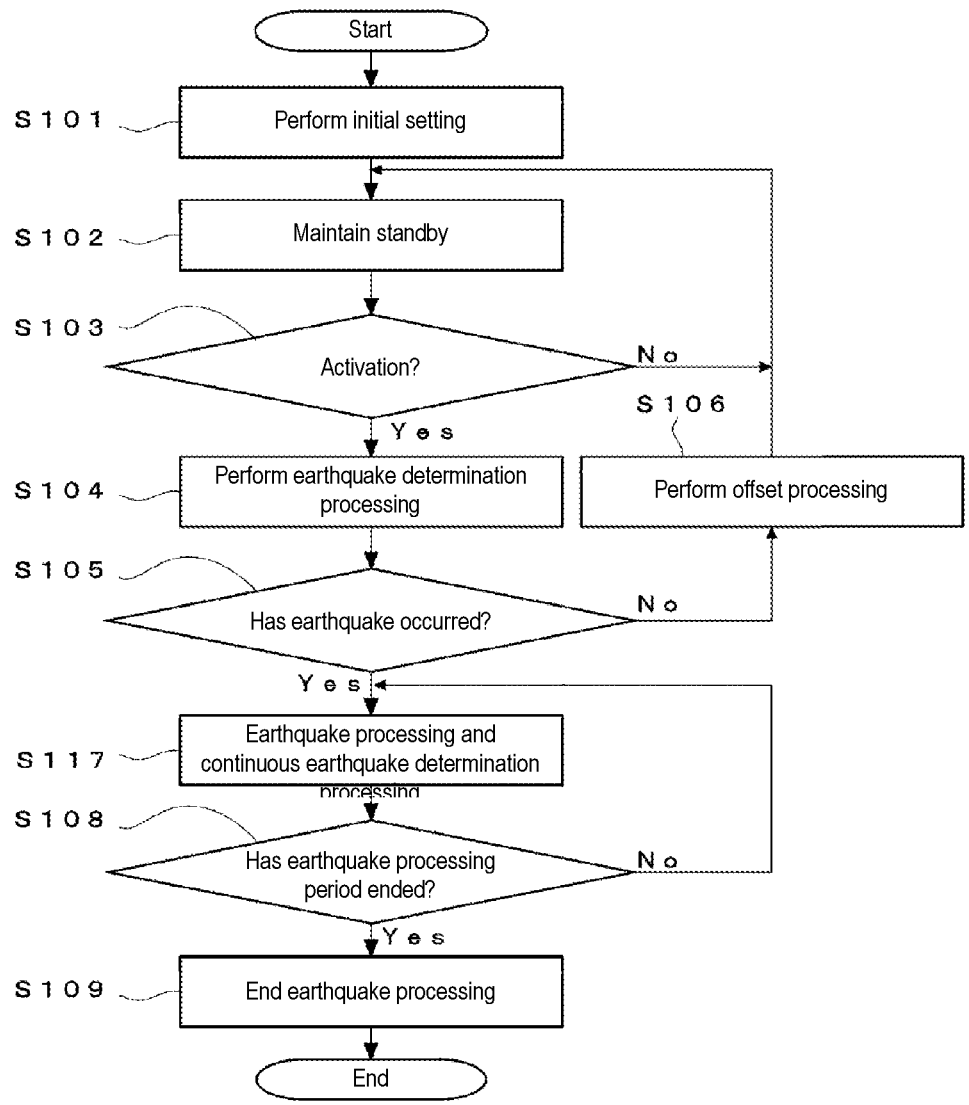
FIG. 6 is a processing flowchart showing an example of seismic processing by a seismic sensor according to Example 1 of the present invention.

FIG. 6 shows a processing flow of seismic processing by the seismic sensor 21 in the example. This routine is different from the processing flow of the seismic processing shown in FIG. 4 in that earthquake processing and continuous earthquake determination processing of S117 is performed instead of the earthquake processing of S107.

Figure 7:
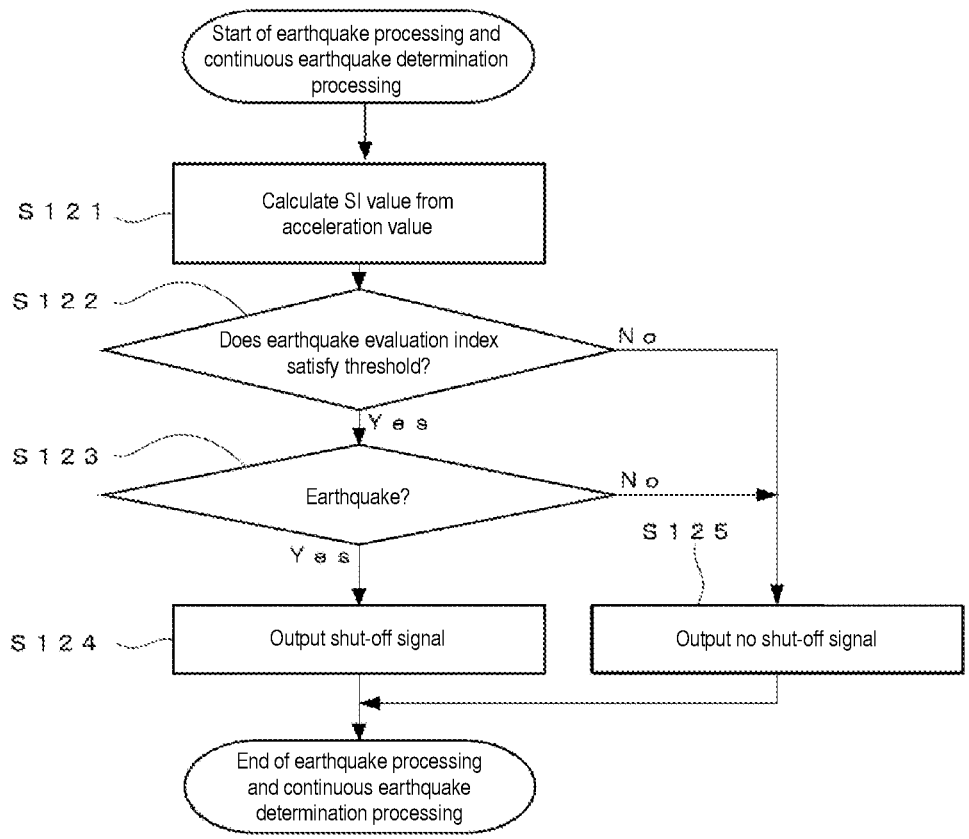
FIG. 7 is a processing flowchart showing an example of earthquake processing and continuous earthquake determination processing according to Example 1 of the present invention.

FIG. 7 shows a processing flow obtained by further disassembling the processing of S117. As shown in FIG. 7, when the "earthquake processing and continuous earthquake determination processing" of S117 starts, first, in S121, an earthquake evaluation index such as an SI value by the evaluation index calculator 106 is calculated from an acceleration value. Note that, in calculating the SI value, the microcontroller 12 operates in the active mode and the SI value is calculated based on Equation (1). When the processing of S121 ends, the process proceeds to S122. In S122, it is determined whether or not the earthquake evaluation index such as the SI value calculated in S120 satisfies a predetermined threshold. In S122, when it is determined that the earthquake evaluation index such as the SI value is equal to or larger than the threshold, the process proceeds to S123 since the vibration is determined to be larger than an estimated strength. Whereas, when it is determined that the earthquake evaluation index such as the SI value is less than the threshold, the process proceeds to S125 since the vibration itself is determined to be less than the estimated strength and not so large as to require shutting off of the related device.

In S123, it is determined again whether or not an earthquake has occurred as in S105. More specifically, the earthquake determination unit 105 determines whether the acceleration value satisfies a predetermined condition. For example, the earthquake determination unit 105 determines that an earthquake has occurred, when a difference between a maximum value and a minimum value of acceleration measured in the determination period is 100 gal or more. In this case, the determination criterion in the continuous earthquake determination processing is the same as the determination criterion in the earthquake determination processing. When it is determined in S123 that an earthquake has occurred, the process proceeds to S124. Whereas, when it is determined that no earthquake has occurred, the process proceeds to S125.

In S124, a shut-off signal is output to an external device (not shown). Whereas, no shut-off signal is output in S125. When the processing of S124 or S125 ends, the earthquake processing and continuous earthquake determination processing ends, and the process proceeds to S108 of FIG. 6.

As described above, according to the example, the continuous earthquake determination processing continues the earthquake determination even after determining that an earthquake has occurred as a result of the earthquake determination processing and then shifting to the earthquake processing. Then, even in a case where it is determined that the earthquake evaluation index such as the SI value is equal to or larger than the threshold in the earthquake processing, the shut-off signal is not output to the external device when it is determined in the continuous earthquake determination processing that no earthquake has occurred. This makes it possible to continue the earthquake determination over a longer period, and more reliably suppress output of the shut-off signal in a situation where no earthquake actually occurs. Moreover, in the earthquake processing and continuous earthquake determination processing in the example, when it is determined as not an earthquake, shift may be made to the standby state or to an offset processing state. Alternatively, it is possible to return to the earthquake determination, continue the earthquake determination, or continue to perform the earthquake processing.

In Example 1 above, as an example, the earthquake determination unit 105 determined that an earthquake has occurred when a difference between a maximum value and a minimum value of acceleration measured in the determination period is 100 gal or more. However, the determination criterion of the earthquake determination is not limited to the above. For example, in addition to a difference between a maximum value and a minimum value, there may be used an average value of acceleration or a filter value thereof measured during a predetermined period, a sum of an average value and a variance value (or standard deviation), a variance value, an integrated value, a change rate, a frequency, a spectrum, an integral value, an SI value, a maximum acceleration value, a response speed value, a maximum speed value, and a maximum displacement amount. That is, various values corresponding to acceleration measured in each determination period can be adopted. Then, it is determined as an earthquake when an obtained value and a predetermined threshold satisfy a predetermined magnitude relationship.

Further, in a case of adopting a sum of an average value and a variance value, for example, when a standard deviation is a, a value obtained by multiplying a by a predetermined coefficient may be handled as the variance value. This enables suppression of activation due to noise when a noise component according to a normal distribution is detected. Note that the integrated value may be a value obtained by adding accelerations measured at a predetermined sampling cycle or a value obtained by adding absolute values of accelerations. As for the frequency, for example, it may be determined whether or not a peak frequency is a predetermined frequency (for example, 1 Hz or the like). As for the spectrum, it may be determined as an earthquake when spectral intensity in a predetermined cycle band and a predetermined threshold satisfy a predetermined magnitude relationship. Further, for example, there may be used a value obtained by combining two or more of the above-described values by addition, subtraction, division, and division.

Example 2

Next, Example 2 of the present invention will be described.

Here, in conventional earthquake determination processing performed for determining an occurrence of an earthquake in Example 1, even when a pulse impact is detected due to human-based vibration and the like instead of a continuous vibration such as an earthquake, a case has been considered where a shut-off signal is output as a result during earthquake processing, on the assumption that an earthquake has occurred.

Figure 8:
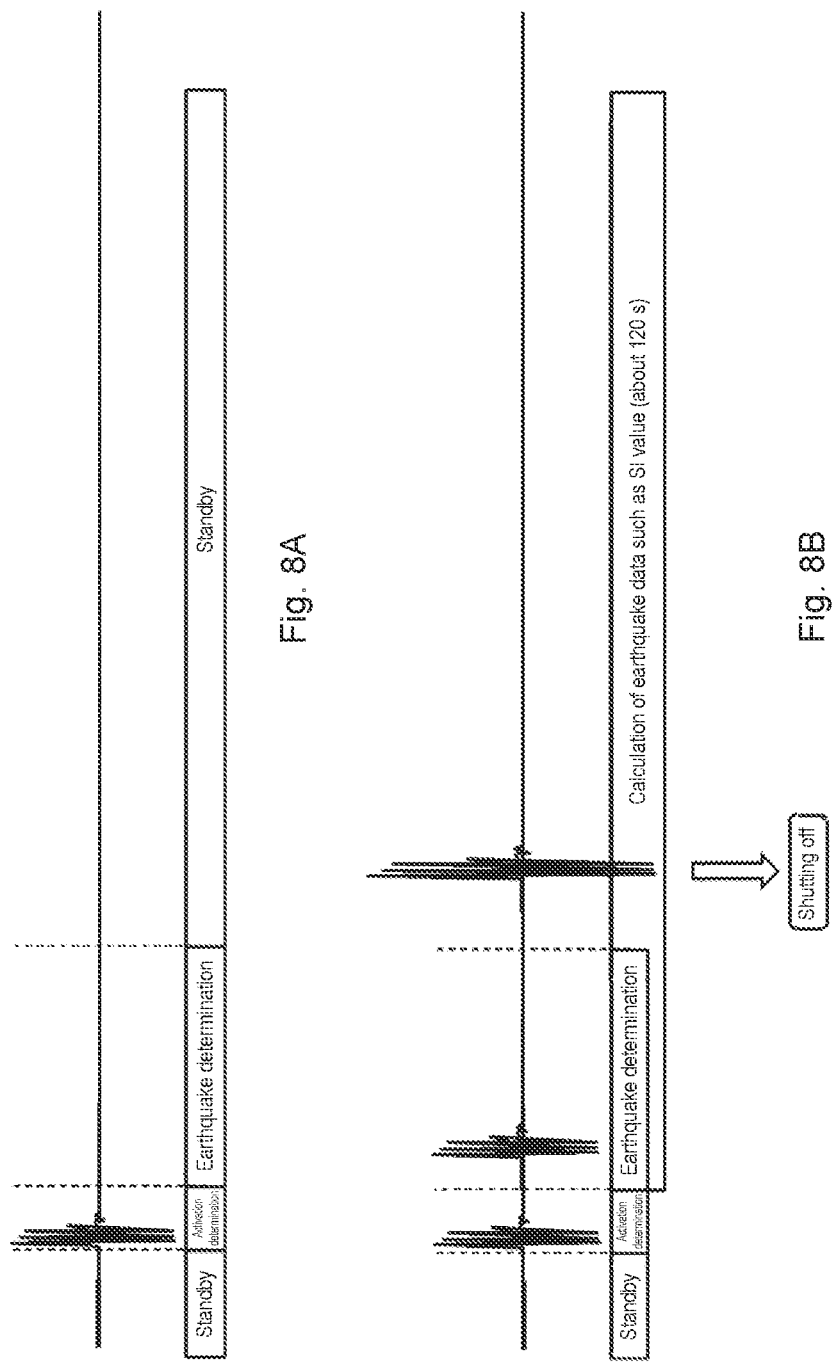
FIGS. 8A and 8B are views showing an operation of the seismic sensor according to Example 1 when acceleration due to a pulse impact is detected.

FIGS. 8A and 8B are views showing a response state of seismic processing to a pulse impact in Example 1. As shown in FIG. 8A, when a pulse impact is detected only once in the standby state, the process temporarily shifts to the earthquake determination processing (measurement mode). However, the process returns to the standby state when the earthquake determination processing ends since it is not determined that an earthquake has occurred in the determination period in the earthquake determination processing. However, as shown in FIG. 8B, when a pulse impact is detected for a plurality of times, there has been a case where a shut-off signal is output in the earthquake processing. In other words, when a pulse impact is detected in the standby state, in the earthquake determination processing shifted from the standby state, and in the earthquake processing after shifting from the earthquake determination processing, there has been a case where that the SI value is equal to or larger than a threshold in the earthquake processing, and the continuous earthquake determination processing also determines that an earthquake has occurred.

In the example, the following processing is performed such that an occurrence of an earthquake is not erroneously determined even when a pulse impact is detected for a plurality of times as described above.

Figure 9:
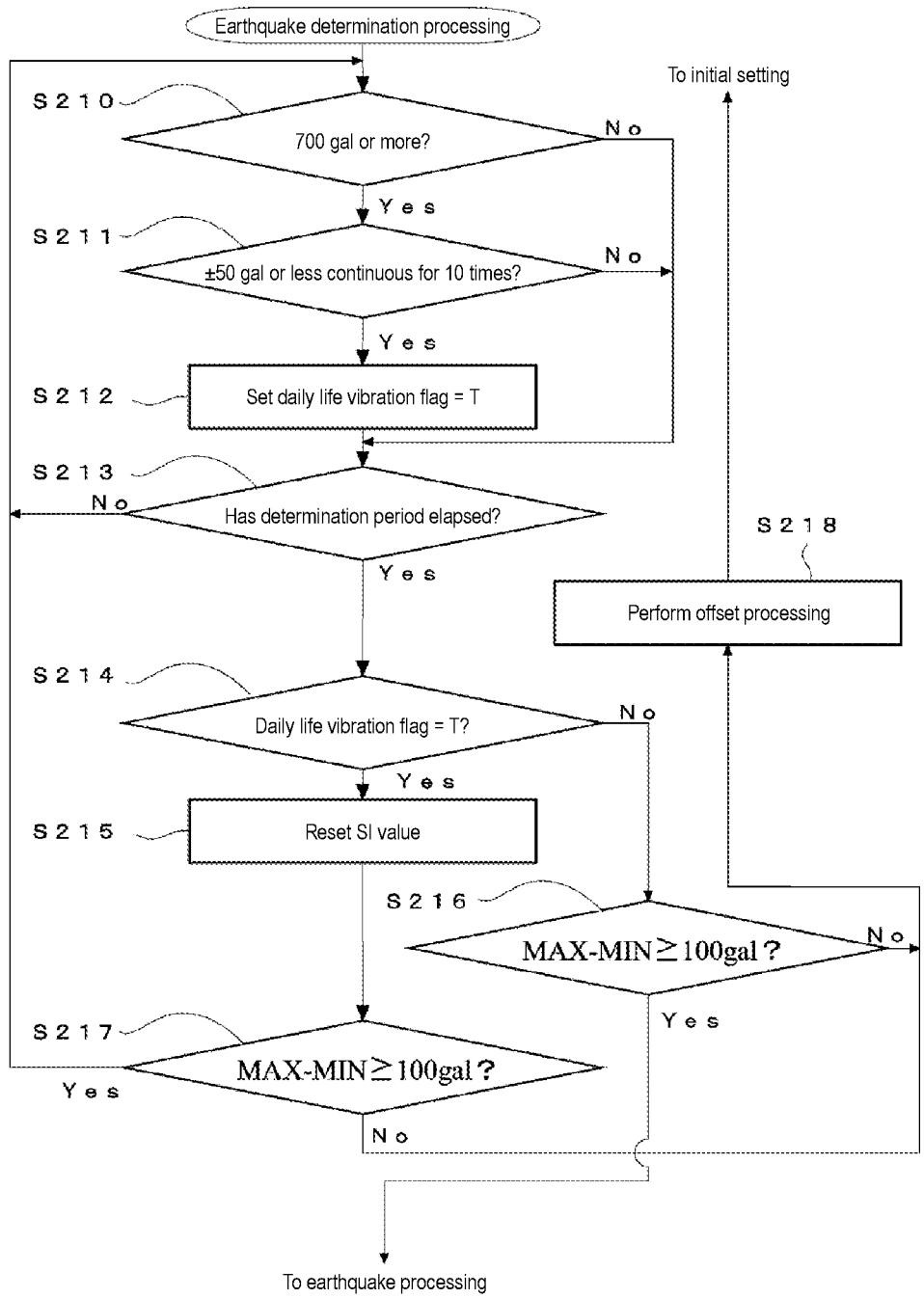
FIG. 9 is a processing flowchart showing an example of earthquake determination processing according to Example 2 of the present invention.

The flow itself of the seismic processing in the example is the same as the seismic processing in Example 1 shown in FIG. 6. However, in the example, processing contents of the earthquake determination processing S104, the determination processing S105 as to whether or not an earthquake has occurred, and the earthquake processing and continuous earthquake determination processing in S117 are different. FIG. 9 shows a detailed flow of the earthquake determination processing in the example.

In the seismic processing in the example, when the standby state shifts to the measurement mode and the earthquake determination processing starts, first, the process proceeds to S210, and it is determined whether or not acceleration of 700 gal or more has been detected in the determination period. Here, when it is determined that acceleration of 700 gal or more is not detected in the determination period (S210: NO), the process proceeds to S213 since the impact is determined not to be due to daily life vibration. Whereas, when it is determined in S210 that the acceleration of 700 gal or more is detected in the determination period, the process proceeds to S211 since it is determined that an impact due to daily life vibration may have been detected.

In S211, it is determined whether or not acceleration of ±50 gal or less has been detected continuously for 10 times or more, after the acceleration of 700 gal or more is detected in the determination period. Here, when it is determined that acceleration of ±50 gal or less has been detected continuously for 10 times or more after the acceleration of 700 gal or more is detected (S211: YES), the process proceeds to S212 since the acceleration waveform is a waveform that converges sharply after a large pulse of a certain level or higher, and the pulse impact is determined to be caused by daily life vibration. Whereas, when the acceleration greater than ±50 gal is detected (S211: NO) at least once out of 10 detections after the acceleration of 700 gal or more is detected, the process proceeds to S213 since it is not determined as a pulse impact caused by daily life vibration.

In the processing of S212, a daily life vibration flag is set to T on the premise that the acceleration detected in the determination period is a pulse impact caused by daily life vibration. When the processing of S212 ends, the process proceeds to S213. In S213, it is determined whether or not the determination period has elapsed. When it is determined that the determination period has not yet elapsed (S213: NO), the process returns to before the processing of S210, and the detection of acceleration due to an earthquake/impact and the determination as to whether daily life vibration or not are continued. Whereas, when it is determined in S213 that the determination period has elapsed (S213: YES), the process proceeds to S214.

In S214, it is determined whether or not the daily life vibration flag is set to T. Here, when it is determined that the daily life vibration flag is set to T (S214: YES), the process proceeds to S215 since the detected acceleration is determined to be caused by daily life vibration. Whereas, when it is determined that the daily life vibration flag is not set to T (S214: NO), the process proceeds to S216 since it is determined that an earthquake may have occurred.

In S215, the SI value calculated so far is reset. When the processing of S215 ends, the process proceeds to S217. In S216, it is determined whether or not a difference obtained by subtracting a minimum value from a maximum value of acceleration detected in the determination period is 100 gal or more. When affirmative determination is made here, the process shifts to the earthquake processing since it is determined that an earthquake has occurred. Whereas, when negative determination is made, it is determined that no earthquake has occurred, and thus the process proceeds to S218, and the process returns to the initial setting processing after the offset processing is performed.

Further, also in S217, it is determined whether or not a difference obtained by subtracting a minimum value from a maximum value of acceleration detected in the determination period is 100 gal or more. Here, when affirmative determination is made, since a large acceleration has been detected while being determined to be caused by daily life vibration, the process returns to before the process before S210 to further continue the earthquake determination processing. Whereas, when negative determination is made in S217, it is determined that no earthquake has occurred, and thus the process proceeds to S218, and the process returns to the initial setting processing after the offset processing is performed.

FIGS. 10A and 10B show an operation when a pulse impact is repeatedly detected in a case where the earthquake determination processing of Example 1 is executed and a case where the earthquake determination processing of this example is executed. FIG. 10A shows an operation of the seismic sensor when the earthquake determination processing of Example 1 is executed, while FIG. 10B shows an operation of the seismic sensor when the earthquake determination processing of this example is executed. As shown in FIG. 10A, when the earthquake determination processing of Example 1 is executed, shift is made to the measurement mode in response to detection of a pulse impact in the standby state, and it is determined that an earthquake has occurred in response to further detection of a pulse impact in the determination period. Then, since the SI value calculated in the earthquake processing exceeds a threshold, and it is determined that an earthquake has occurred also in the continuous earthquake determination processing, there is a possibility that a shut-off signal is output.

Whereas, when the earthquake determination processing in the example is executed, the earthquake determination processing is repeated in a plurality of determination periods during repeated detection of pulse impacts, and the process returns to the standby state when a pulse impact is no longer detected.

Furthermore, as shown in FIGS. 11A and 11B, even if the process shifts to earthquake processing, it is determined as an impact caused by daily life vibration in the continuous earthquake determination processing when a pulse impact waveform is detected. Then, a shut-off signal is not output even if the SI value satisfies the shut-off condition, the earthquake processing is forcibly ended, and the process returns to the standby state. Note that the continuous earthquake determination unit 201 is not always necessary to return to the standby state after the shut-off determination unit 202 performs processing of inhibiting output of the shut-off signal, but may continue the earthquake processing and continuous earthquake determination processing as it is. Moreover, in the example, a process in which the continuous earthquake determination unit 201 continues determination as to whether or not a condition of a determination memory 109 is satisfied even after shifting to the earthquake processing, corresponds to the continuous earthquake determination step. In addition, a process in which, based on the earthquake evaluation index such as the SI value, the shut-off determination unit 202 outputs a shut-off signal when the earthquake is a certain magnitude or larger and is considered as an earthquake by the continuous earthquake determination unit 201, but not output the shut-off signal when the earthquake is a certain magnitude or larger and is not considered as an earthquake by the continuous earthquake determination unit 201, corresponds to a shut-off determination step.

Moreover, the earthquake determination processing shown in FIG. 9 has used three conditions of (1) is the detected acceleration 700 gal or more?(2) has acceleration of ±50 gal or less been detected continuously for 10 times after acceleration of 700 gal or more has been detected? and (3) is a difference obtained by subtracting a minimum value from a maximum value of acceleration detected in a determination period 100 gal or more? Then, depending on whether or not these conditions are satisfied, it has been determined whether to continue the earthquake determination processing, shift to the earthquake processing, or return to the standby process. However, the present invention is not necessarily limited to the processing of making the above determination using all the conditions (1) to (3). Note that the condition of (2) has acceleration of ±50 gal or less been detected continuously for 10 times after acceleration of 700 gal or more has been detected? intends to detect, as an impact, a waveform that sharply converges after a large pulse.

FIG. 12 shows variations when the determination condition in the earthquake determination processing is changed depending on whether or not to adopt the above condition (1) is the detected acceleration 700 gal or more? and on whether or not to repeat the determination period of earthquake determination for a plurality of times. As shown below, the present invention is assumed to be also applicable to seismic processing in which the determination period is limited to one time, in addition to the seismic processing on the assumption that the determination period of earthquake determination is repeated for a plurality of times.

In a pattern of repeatedly executed determination period with the condition of 700 gal or more, which is a pattern in the first quadrant in FIG. 12, the pulse impact is determined to be caused by daily life vibration in a case where, in a first determination period, a maximum acceleration of 700 gal or more is detected, a difference obtained by subtracting a minimum value from a maximum value of acceleration detected in the determination period is less than 100 gal, and the maximum acceleration of 700 gal or more is detected and then acceleration of ±50 gal or less is detected continuously for 10 times or more. Then, in a case of a pulse impact caused by daily life vibration, the earthquake determination is repeated. Further, in a case of a pulse impact caused by daily life vibration, the SI value is reset once.

In a pattern of one time determination period with the condition of 700 gal or more, which is a pattern in the second quadrant in FIG. 12, the pulse impact is determined to be caused by daily life vibration and the process returns to the standby state in a case where, in the first determination period, a maximum acceleration of 700 gal or more is detected, and then acceleration of ±50 gal or less is detected continuously for 10 times or more. These two conditions have priority over the condition that a difference obtained by subtracting a minimum value from a maximum value of acceleration detected in the determination period is less than 100 gal.

In a pattern of one time determination period without the condition of 700 gal or more, which is a pattern in the third quadrant in FIG. 12, the pulse impact is determined to be caused by daily life vibration, and the process returns to the standby state in a case where, in the first determination period, a difference obtained by subtracting a minimum value from a maximum value of detected acceleration is less than 100 gal, or acceleration of ±50 gal or less is detected continuously for 10 times or more. However, in a case where a difference obtained by subtracting a minimum value from a maximum value of acceleration detected in the first determination period is less than 100 gal, and acceleration of ±50 gal or less is detected continuously for 10 times or more, the offset value is not updated (offset processing is not performed).

In a pattern of repeatedly executed determination period without the condition of 700 gal or more, which is a pattern in the fourth quadrant in FIG. 12, the pulse impact is determined to be caused by daily life vibration in a case where, in a first determination period, a difference obtained by subtracting a minimum value from a maximum value of detected acceleration is less than 100 gal, and acceleration of ±50 gal or less is detected continuously for 10 times or more. Then, in a case of a pulse impact caused by daily life vibration, the earthquake determination is repeated. Further, in a case of a pulse impact caused by daily life vibration, the SI value is reset once.

Figure 13A:
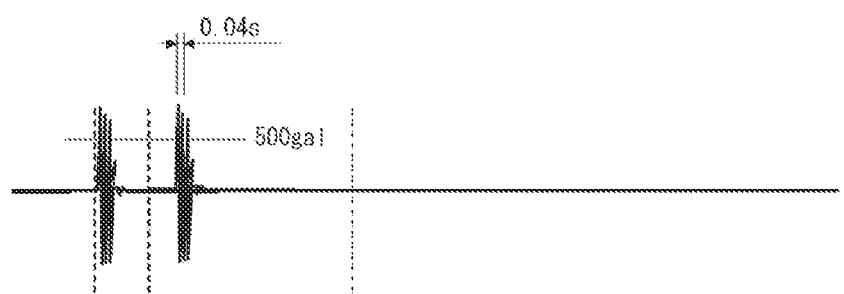
FIGS. 13A and 13B are views for explaining conditions for determining as a pulse impact caused by daily life vibration in the earthquake determination processing.

In addition, instead of the determination conditions (1) to (3) in the earthquake determination processing in Example 2 above, as shown in FIG. 13A, there may be used the two determination conditions of (4) is a difference obtained by subtracting a minimum value from a maximum value of acceleration detected in a determination period 100 gal or more? and (5) is acceleration of 500 gal or more at a cycle of 0.04 sec or less made?

Figure 13B:
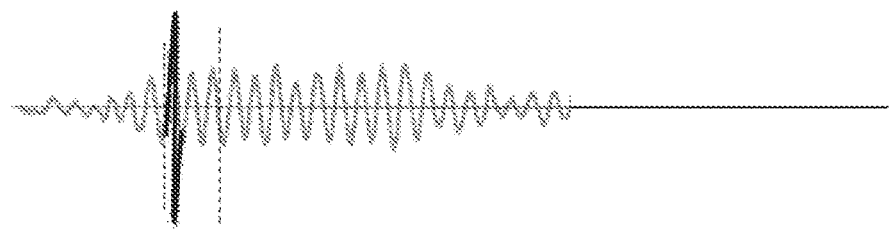

Further, in the above earthquake/impact process, as shown in FIG. 13B, when fixed cyclic acceleration is detected after detection of a pulse impact, the acceleration is determined as an impact and vibration based on daily life vibration.

As shown in FIG. 13B, in the example, for a waveform in which a fixed cyclic waveform follows after a pulse impact is detected, a case is assumed where, for example, a pulse impact occurs when human-based vibration occurs, and then fixed frequency vibration based on a natural frequency of the installation environment of the seismic sensor continues. Further, a case is assumed where a pulse vibration is generated by human-based vibration in a state where a certain amount of vibration is generated.

Figure 14:
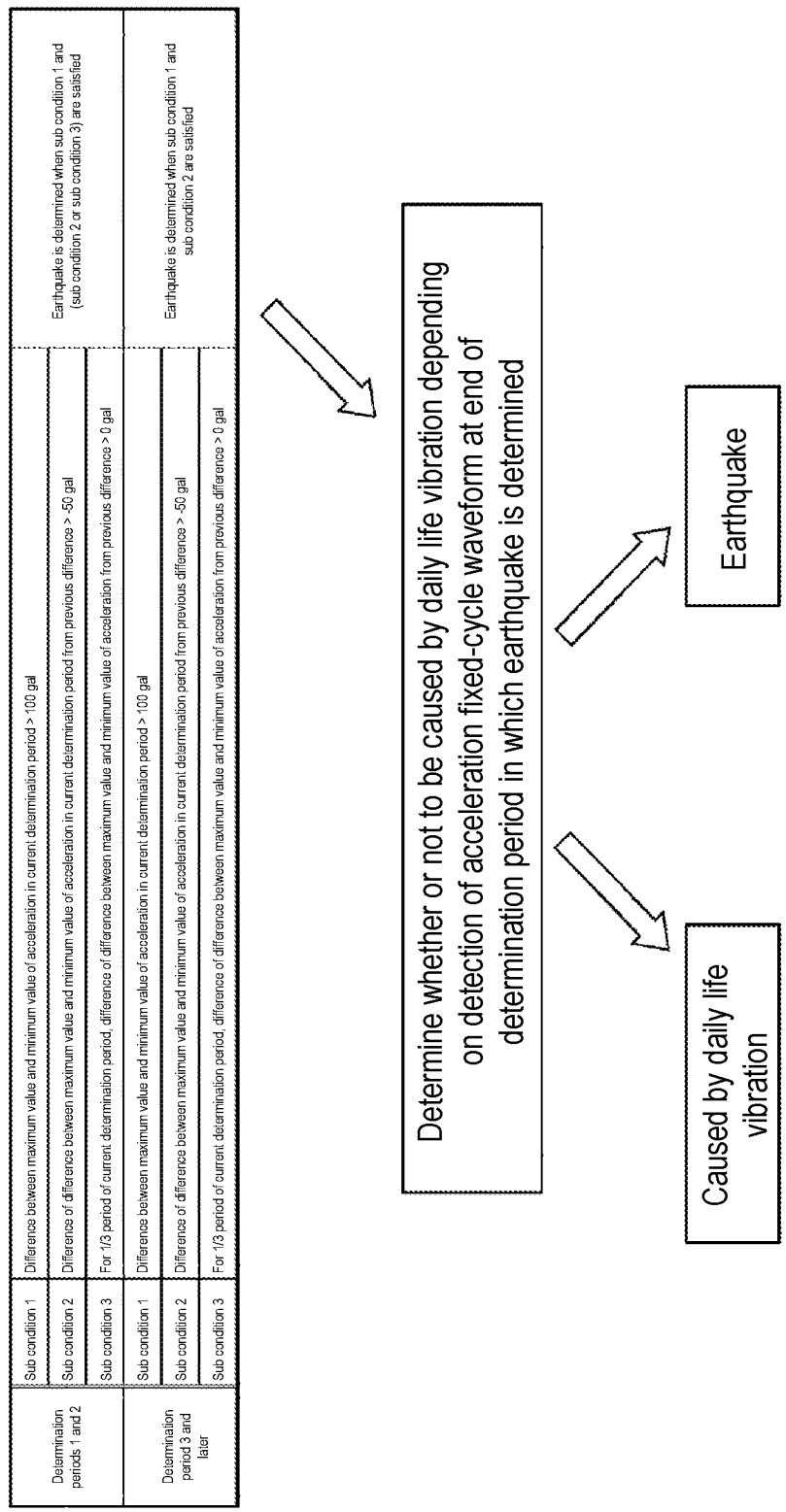
FIG. 14 is a view for explaining earthquake determination conditions and operations in the earthquake determination processing.

As shown in FIG. 14, the determination conditions in this case are: (4) is a difference obtained by subtracting a minimum value from a maximum value of acceleration detected in a determination period 100 gal or more? (6) is a difference of a difference between a maximum value and a minimum value of acceleration in the current determination period from that in a previous determination period >−50 gal? and (7) for a ⅓ period of a current determination period, is a difference of a maximum value and a minimum value of acceleration from those of a previous ⅓ period >0 gal? Then, for first and second determination periods, it is determined that an earthquake has occurred when (4) and ((6) or (7)) are satisfied, while for the third and subsequent determination periods, it is determined that an earthquake has occurred when (4) and (6) are satisfied.

Further, in this example, when a fixed cycle waveform of acceleration is detected at the end of the determination period in which an occurrence of an earthquake is determined, this is determined as an impact and vibration caused by daily life vibration, and the process shifts to the next determination period. Further, when a fixed cycle waveform of acceleration is not detected at the end of the determination period in which an occurrence of an earthquake is determined, the determination of the occurrence of an earthquake is confirmed as it is, and the process shifts to the earthquake processing.

Note that the numerical values used for the conditions of the above-described examples are merely examples, and can be appropriately changed within a range consistent with the gist of the invention.

Figure 15:
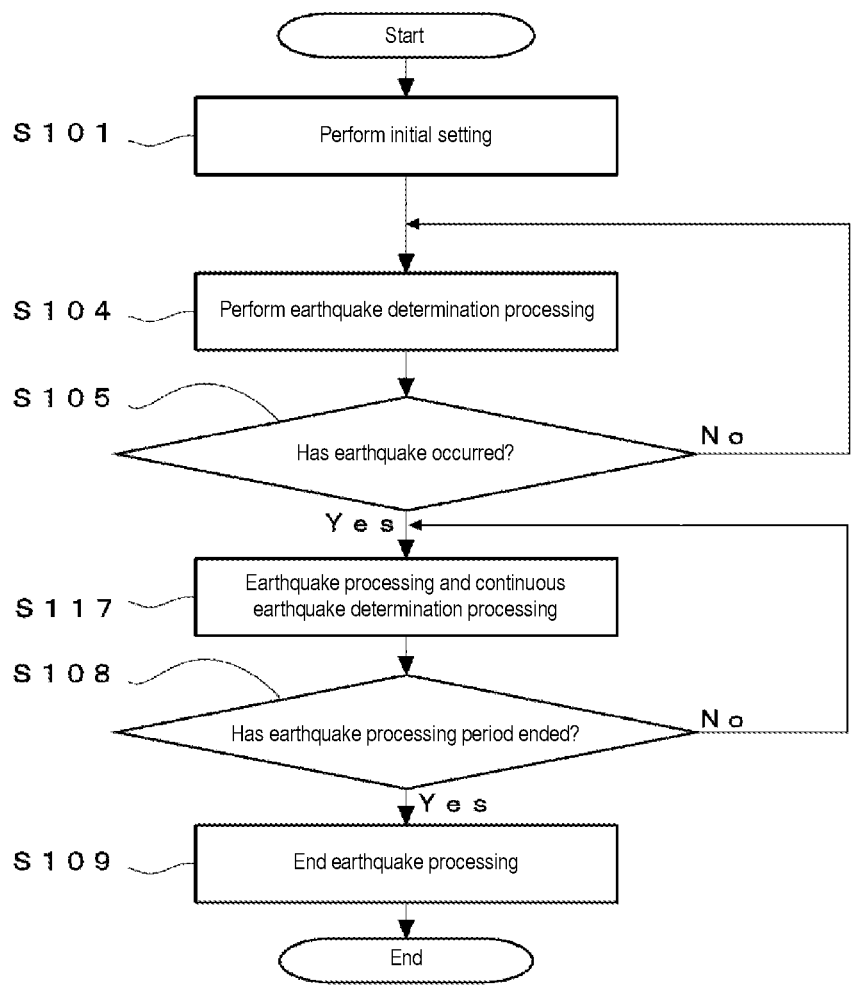
FIG. 15 is a processing flowchart showing an example of seismic processing in a seismic sensor in a case where a power saving mode is not set.

For example, the present invention is also applicable to a seismic sensor in which a power saving mode is not set. In this case, in the above example, the process of "when processing in the power saving mode is executed and acceleration measured in the power saving mode exceeds a threshold, the power saving mode is shifted to the measurement mode" is not necessary. FIG. 15 shows a flowchart of seismic processing in the seismic sensor in which the power saving mode is not set. In this case, as compared with the flowchart of the seismic processing shown in FIG. 6, it can be seen that the processing of S102 of maintaining the standby state and the processing of S103 for the activation determination unit 103 of the seismic sensor 1 to determine whether or not to activate are omitted. That is, in the seismic processing in FIG. 15, the earthquake determination processing is always performed, and the earthquake processing is interrupted, for example, when the impact is determined to be human-based and is not an earthquake, even after it is once determined in S105 that an earthquake has occurred and shift is made to earthquake processing and the continuous earthquake determination processing. Here, a period of each earthquake determination may be uniform or may be changed.

Further, FIGS. 16A and 16B show an operation of the seismic sensor when a pulse impact is repeatedly detected in a case where the power saving mode is not set. FIG. 16A corresponds to an operation of the seismic sensor when the earthquake determination processing of Example 1 shown in FIG. 10A is executed, while FIG. 16B corresponds to an operation of the seismic sensor when the earthquake determination processing in Example 2 shown in FIG. 10B is executed. In FIGS. 16A and 16B, as compared with the processing shown in FIGS. 10A and 10B, the processing of making an activation determination from the standby state (power saving mode) and shifting to the earthquake determination processing (measurement mode) is omitted, and the earthquake determination processing is directly performed.

In FIG. 16A, it is determined that an earthquake has occurred when a pulse impact is detected in the determination period of the earthquake determination, and a pulse impact further detected in the determination period. In this case, since the SI value calculated in the earthquake processing exceeds a threshold, and it is determined that an earthquake has occurred also in the continuous earthquake determination processing, a shut-off signal is output. Whereas, when the earthquake determination processing shown in 16B is executed, the shut-off signal is not output and the earthquake determination processing is repeated in a plurality of determination periods during repeated detection of pulse impacts, and the earthquake determination processing is continued even when a pulse impact is no longer detected.

Further, FIGS. 17A and 17B show an operation of the seismic sensor when acceleration due to a pulse impact is detected in the continuous earthquake determination processing in a case where the power saving mode is not set. This corresponds to the operation of FIGS. 11A and 11B in a case where the power saving mode is set. In FIGS. 17A and 17B, as compared with the processing shown in FIGS. 11A and 11B, the processing of making an activation determination from the standby state (power saving mode) is omitted, and the earthquake determination processing is directly performed. In the example shown in FIG. 17A, when a pulse impact waveform is detected in the continuous earthquake determination processing, a shut-off signal may be output. Whereas, in the example shown in FIG. 17B, when a pulse impact waveform is detected in the continuous earthquake determination processing, it is determined as an impact caused by daily life vibration in the continuous earthquake determination processing. Then, the shut-off signal is not output even if the SI value satisfies the shut-off condition, the earthquake processing is forcibly ended, and the process returns to the earthquake determination processing.

DESCRIPTION OF SYMBOLS 1 seismic sensor
11 acceleration sensor
12 microcontroller
13 memory
14 output unit
15 input unit
101 acceleration measurement unit
102 acceleration memory
103 activation determination unit
104 reference value memory
105 earthquake determination unit
106 evaluation index calculator
107 output unit
108 offset adjustment unit
109 determination memory
110 filter
201 continuous earthquake determination unit
202 shut-off determination unit

The invention claimed is:

1. An earthquake determination method comprising:
shifting to a measurement mode from a standby state when an acceleration larger than a threshold is measured by a measurement unit in the standby state;
calculating an index value indicating a scale of an earthquake based on the acceleration measured in an earthquake processing period starting after a predetermined period has elapsed after shifting to the measurement mode;
wherein a shut-off signal for shutting off an operation of a related device is output based on an index value calculated in the earthquake processing period, the earthquake determination method further comprising:
a continuous earthquake determination step of determining whether or not an earthquake has occurred, based on the acceleration measured in the earthquake processing period,
a shut-off determination step of inhibiting output of the shut-off signal when it is determined that no earthquake has occurred in the continuous earthquake determination step.

2. The earthquake determination method according to claim 1, wherein the measurement mode is operated in an active mode with higher power consumption than that of the standby state.

3. The earthquake determination method according to claim 1, wherein in the standby state, the measurement of acceleration is repeated with larger cycle than that of the measurement mode.

4. The earthquake determination method according to claim 1, wherein when a pulse impact caused by daily life vibration is detected before the predetermined period has elapsed after shifting to the measurement mode, output of the shut-off signal for shutting off an operation of a related device is inhibited.

5. The earthquake determination method according to claim 1, wherein in the continuous earthquake determination step, whether or not an earthquake has occurred is determined by whether the acceleration is due to an impact caused by daily life vibration or not.

6. The earthquake determination method according to claim 5, wherein when fixed cyclic acceleration is detected, the acceleration is determined as the impact based on daily life vibration.

7. An earthquake determination method comprising:
shifting to a measurement mode from a standby state when an acceleration larger than a threshold is measured by a measurement unit in the standby state.
calculating an index value indicating a scale of an earthquake based on the acceleration measured in an earthquake processing period starting after a predetermined period has elapsed after shifting to the measurement mode,
wherein when it is determined that an earthquake of a certain magnitude or larger or a vibration larger than an estimated strength is occurred in the earthquake processing period, a shut-off signal for shutting off an operation of a related device is output, the earthquake determination method further comprising:

a continuous earthquake determination step of determining whether or not an earthquake has occurred, based on the acceleration measured in the earthquake processing period, a shut-off determination step of determining as to whether the measured acceleration is due to an earthquake or noise, and outputting the shut-off signal when it is determined that the earthquake has occurred, and inhibiting output of the shut-off signal when it is determined that the measured acceleration is due to noise.

8. The earthquake determination method according to claim 7, wherein the measurement mode is operated in an active mode with higher power consumption than that of the standby state.

9. The earthquake determination method according to claim 7, wherein
in the standby state, the measurement of acceleration is repeated with larger cycle than that of the measurement mode.

10. The earthquake determination method according to claim 7, wherein
when a pulse impact caused by daily life vibration is detected before the predetermined period has elapsed after shifting to the measurement mode, output of the shut-off signal for shutting off an operation of a related device is inhibited.

11. The earthquake determination method according to claim 7, wherein
in the continuous earthquake determination step, whether or not an earthquake has occurred is determined by whether the acceleration is due to an impact caused by daily life vibration or not.

12. The earthquake determination method according to claim 11, wherein
when fixed cyclic acceleration is detected, the acceleration is determined as the impact and vibration based on daily life vibration.

* * * * *